Jan. 2, 1934.  E. O. HILLER  1,941,897
APPARATUS FOR FEEDING BATCH TO GLASS MELTING FURNACES
Filed Oct. 27, 1932  2 Sheets-Sheet 1
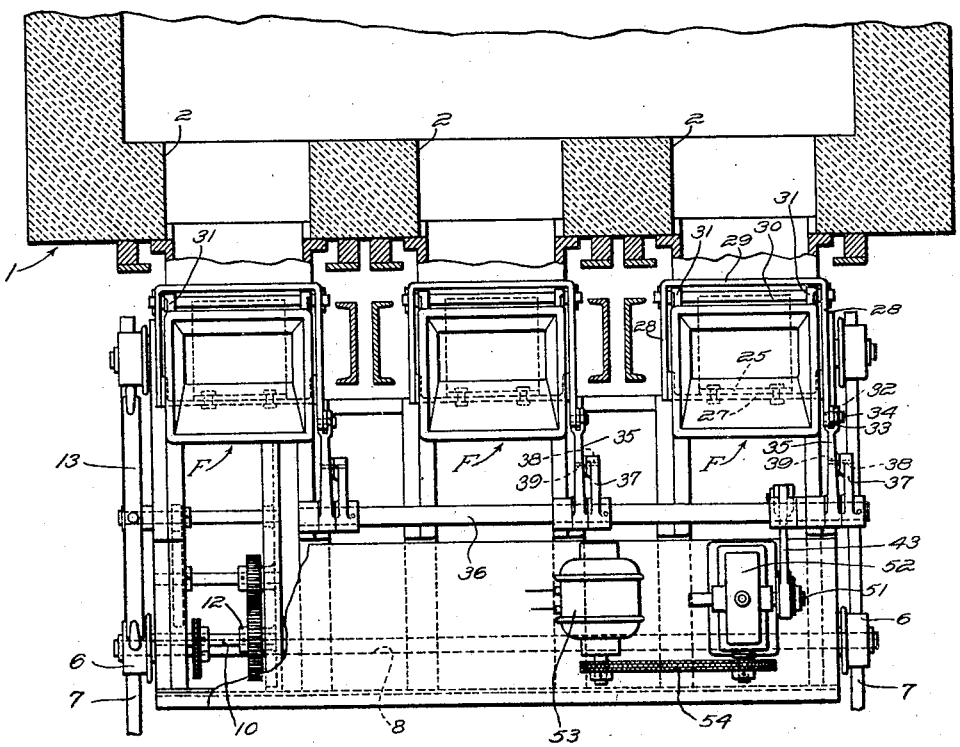
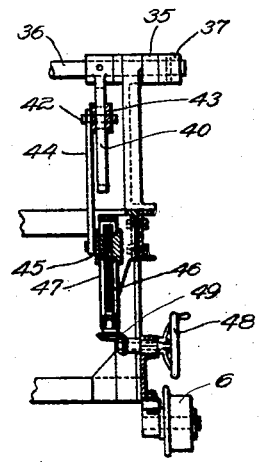
Inventor;
Everett O. Hiller
By Brown & Parham
Attorneys

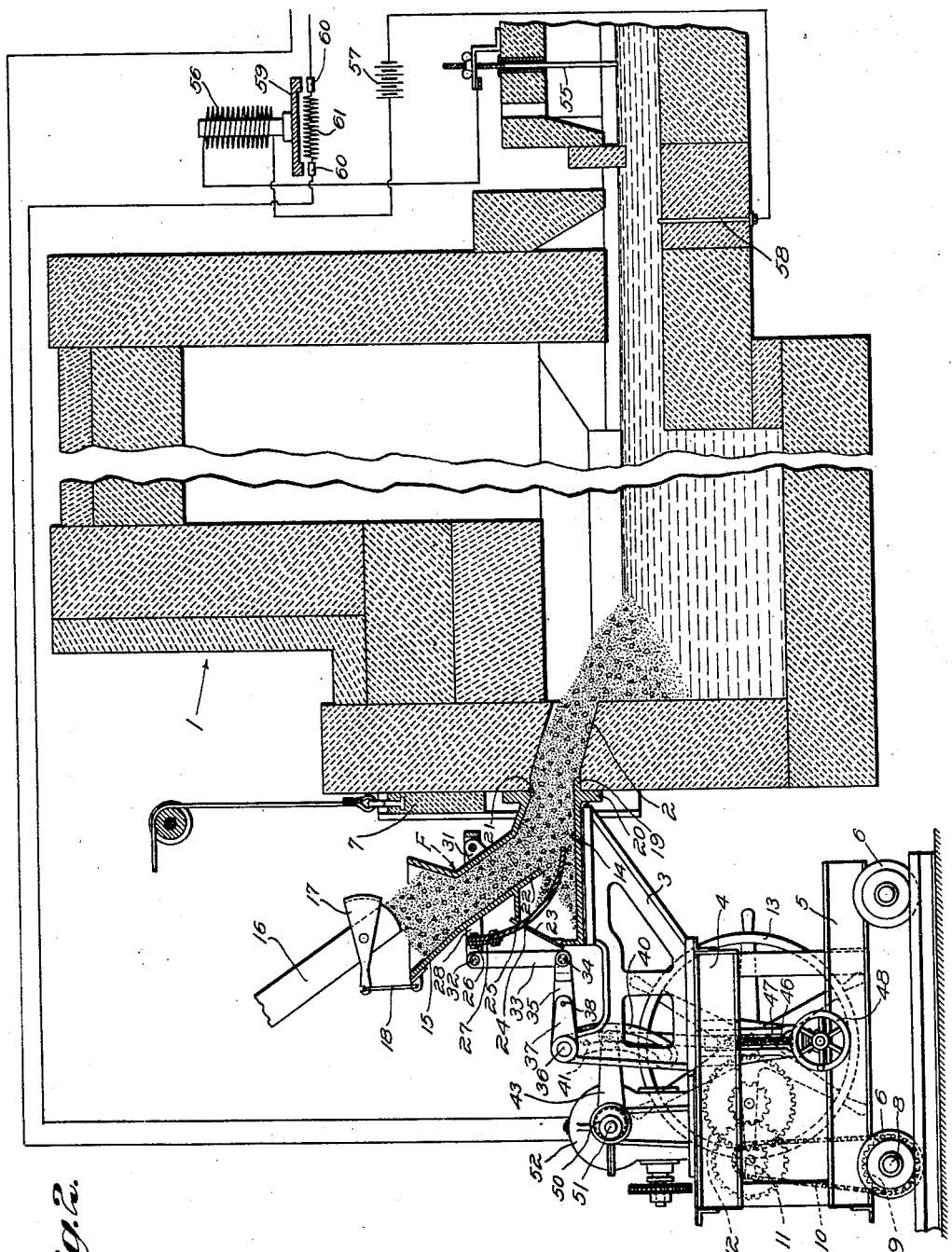

Patented Jan. 2, 1934

1,941,897

UNITED STATES PATENT OFFICE 1,941,897

APPARATUS FOR FEEDING BATCH TO GLASS MELTING FURNACES

Everett O. Hiller, Windsor, Conn., assignor to Hartford-Empire Company, Hartford, Conn., a corporation of Delaware Application October 27, 1932. Serial No. 639,778

16 Claims. (Cl. 49—54)

This invention relates generally to improvements in devices for feeding glass-making materials or batch to glass melting tanks or furnaces.

The invention relates more particularly to batch feeders of that type which employs a mechanically operated movable member for impelling or otherwise feeding batch from a feed chamber into a glass-making furnace or tank to which the batch feeder has been applied.

The operation of prior mechanically operated batch feeders, of which the applicant is aware, has been attended by certain disadvantageous or objectionable features. The mechanically operated moving members of such batch feeders quickly become worn. This not only militates against maintenance of accurate control of the rate of feeding of batch to a glass-making furnace or tank, but also necessitates the cessation of operation of such batch feeders at frequent intervals for replacement of the worn movable batch feeding members. Also, the operation of at least some of such batch feeding members causes a forcing back or withdrawal of batch on the retractive or non-feeding strokes of the movable member. This frequently causes diffusion of dust from the batch and of particles of batch in the vicinity of the batch feeding devices, if the batch feeding devices are not tightly closed at their rearward ends, and may cause clogging thereof, particularly if the batch feeding chambers are closed.

An object of the present invention is to provide a batch feeder of the type above referred to that will be free from the objectionable and disadvantageous features of the prior art batch feeders.

A further object of the invention is to provide a batch feeder of the character described which will be adapted to feed batch from a feed chamber to the charging end of a tank or furnace at a rate which may be regulated and accurately controlled to meet different operating requirements, and which will operate efficiently and uniformly for a relatively long period of time without sustaining any objectionable wear and without requiring replacement of any of the parts thereof.

A further object of the invention is the provision of a batch feeder having a mechanically operated novel batch impelling or feeding member adapted to work in the glass batch in a feed chamber with a minimum of resistance or abrasive action from the batch and without causing further accumulation of batch in the rearward portion of the feed chamber after operating conditions have been established.

A further object of the invention is the provision of a batch feeding mechanism of the character above referred to, which can be readily adjusted to vary within a wide range the feeding of batch into a glass melting tank or furnace, as required to satisfy different service conditions, and which will uniformly maintain the feeding of batch to the tank or furnace at any predetermined adjusted rate.

Prior mechanically operated batch feeding devices of which the applicant is aware are characterized by the provision of batch feeding members which contact with batch in the feed chamber over an area that constitutes a major portion of the cross-sectional area of the batch feed chamber, at least during the batch feeding or impelling strokes of such members. Batch, being highly abrasive, has a decided grinding action on the batch feeding members when thus confined between the batch feeding members and the adjacent walls of the batch feeding chambers.

I have discovered that the feeding or propulsion of batch from a feed chamber into a tank or furnace may be obtained in an improved and better manner without causing harmful grinding or wearing away of the mechanically operated feeding member if such feeding member is of relatively thin or platelike form, and is supported and operated so as to move substantially edgewise in the glass-making materials or batch in the feed chamber.

Because of the form of the feeding member and the provision of ample clearance between the advancing edge or surface of the member and the adjacent walls of the feed chamber, the forward or feeding stroke of the feeding member of the present invention will encounter relatively little resistance from the batch. Nevertheless, the displacement of batch by the forward or feeding strokes of such member will effect delivery of batch from the feed chamber to an associate melting tank or furnace at a rate which may be regulated and accurately controlled to meet various service conditions and which will always be adequate to satisfy any requirement that is likely to be met in actual service.

The improved batch feeding member of the present invention preferably has the form of a plate that is curved from its rearward to its forward edge along an arc of a circle having a radius of relatively great extent. Preferably, this arcuately curved plate is disposed and supported for oscillation about a horizontal axis coincident with the axis of curvature of the plate itself and so that the forward or batch feeding stroke of the plate will displace or impel batch only in the direction of the outlet from the batch feed chamber to the furnace or tank to be charged, while the return or retractive stroke of the plate will not positively impel or carry batch rearwardly in the feed chamber and neither stroke will compress batch between the plate and any of the batch confining or retaining walls of the feed chamber. The arrangement preferably is such that the rearward or retractive stroke of the arcuately curved plate is extended rearwardly so that throughout its stroke a portion of the plate has a slope in excess of the angle of repose of the batch in contact with the plate.

The batch feeding member thus is self-cleaning on its retractive stroke. At the beginning of batch feeding operations, batch from the source of supply will be accumulated in the feed chamber until the latter has been filled from its forward or outlet end to the inlet of the chamber and until an accumulation of batch in the chamber rearwardly of the inlet has assumed a natural slope line. Thereafter, batch will enter the chamber from the inlet as required to replace the batch that is discharged from the outlet end thereof by the forward or feeding strokes of the novel batch feeding member. Some slight variation in the accumulation of batch in the feed chamber rearwardly of the inlet may take place because of shifting or disturbance of the mass of batch in the chamber as successive portions thereof are discharged from the chamber and are replaced by batch from the inlet but such rearward accumulation of batch will not be augmented by positive impulsion or carrying of batch rearwardly by the feeding member as it moves on its retractive strokes.

Other objects and advantages of the invention will become apparent from the following description, when it is considered in conjunction with the accompanying drawings, in which Figure 1 is a horizontal section through the charging end portion of a glass melting tank or furnace equipped with batch feeding mechanism embodying the invention, such batch feeding mechanism being shown in plan and a portion of its supporting structure having been broken away to reveal underlying parts;

Fig. 2 is a broken longitudinal vertical section through the glass melting tank or furnace and through a feeding unit of the batch feeding mechanism of the invention, the supporting and adjustable operating structure for such batch feeding mechanism being shown in side elevation, and the view also showing an electrical control device for regulating the operation of the batch feeding mechanism in accordance with the level of the glass in the delivery end of the tank; and Fig. 3 is a fragmentary view, partly in elevation and partly in vertical section, showing mechanism for adjusting the amplitude of the strokes of the batch feeding members of the apparatus of the invention.

A glass melting tank or furnace, designated generally 1, is shown in Fig. 1 as having an end wall formed with a plurality of horizontally spaced charging openings 2. Associated with each of these charging openings 2 is a batch feeding device or unit F, embodying structural features of the invention.

The respective batch feeding devices F are carried by a framework structure 3 on a platform 4. The platform 4 is supported on a truck 5. The truck 5 is mounted on wheels 6 which are movable on rails 7. The rails 7 are located suitably with reference to the charging end of the furnace 1 so that the truck 5 may be moved on the rails to dispose the feeding devices F in operative positions with respect to the charging openings 2 or to withdraw such batch feeding devices when desired.

When the batch feeding devices have been removed or withdrawn from their operative positions at the outer ends of the charging openings 2, the latter may be closed by vertically slidable refractory blocks or gates, such as that indicated at 7 in Fig. 2.

For convenience in moving the truck 5 and the parts thereon, one pair of the wheels 6 may be secured to the axle, indicated at 8, on which such wheels are mounted. The axle 8 carries a sprocket wheel 9 to which motion may be transmitted through a chain 10 from a sprocket on an intermediate shaft 11. The shaft 11 may be turned by a train of gears 12, which is operable by a relatively large hand wheel 13. The hand wheel 13 is located at one side of the truck in position to be conveniently grasped and manipulated when it is desired to move the truck and the parts thereon along the rails 7.

The respective batch feeding devices F are similar in construction and operation. As shown best in Fig. 2, each batch feeding device F comprises a feed chamber 14 to which batch is delivered from a spout or hopper 15. The latter receives batch from a supply trough or tube 16. The supply trough or tube 16 leads from any convenient source of supply of mixed glass-making materials or batch, such as a batch tank or room (not shown). Discharge of batch from the trough or tube 16 into the hopper or spout 15 may be controlled by a pivoted slide gate 17. The gate 17 is shown in its fully open position and as retained in such position releasably by a latch 18 on the adjacent end of the associate hopper or spout.

The forward end portion of the feed chamber 14 preferably is provided with a bottom extension or lip 19 which will project a short distance into the bottom portion of the associate charging opening or passage 2. Also, the forward end of the chamber 14 preferably is provided with a flange 20 adapted to fit snugly against the outer wall of the tank around the outer end of the charging opening 2. With this arrangement the outlet opening 21 at the forward end of the feed chamber 14 will be accurately aligned with the associate charging passage 2 so that the latter in effect will form a continuation of the feed chamber 14 when the batch feeding device F is in operative position, as shown in Fig. 2.

The juncture of the feed chamber 14 with the hopper or spout 15 may be at the top of the feed chamber, as shown. The hopper or spout 15 preferably is downwardly and forwardly inclined so that the batch delivered thereby will be directed downwardly and formwardly in the batch feeding chamber 14. A depending downwardly and forwardly inclined baffle or lip 22 at the rearward side of the juncture of the spout or hopper 15 with the top of the feed chamber assists in giving to the batch a movement having a downward and forward component, and tends to prevent batch from passing from the spout or hopper into the rearward portion of the batch feeding chamber.

The rear portion of the batch feeding chamber 14 has a removable door or wall section 23 provided with a cut away top portion 24 through which extends the movable batch feeding member or pusher 25.

The glass feeding member or pusher 25 may comprise a plate which is curved longitudinally, i. e. from its rearward to its forward edge, substantially along an arc of a circle struck by a radius of relatively great length. This glass feeding member or pusher 25 may be of uniform thickness through substantially its entire area, and may be made of metal or of any suitable material.

The rearward portion of the member 25 is secured, as by bolts or other suitable fastening devices 26, to a horizontal carrier 27. The carrier 27 may be a cross bar between the arms 28 of a substantially U-shaped yoke or frame member 29, as best seen in Fig. 1. The arms 28 on which the carrier 27 is supported are pivoted on a shaft 30 which is supported by ears 31 on the front portion of the hopper or spout 15. One of these arms 28 is extended beyond its juncture with the carrier 27 for pivotal connection at 32 with a link 33. The link 33 is pivotally connected at 34 (see Fig. 2) to an end portion of an oscillatory arm 35. The arm 35 is loosely mounted on a rock shaft 36. A rocker arm 37 is secured to the rock shaft 36 and carries a pin 38 which may be engaged with an opening 39 in the rocker arm 35, so that the associate arms 37 and 35 will be rocked in unison about the axis of the shaft 36 when the latter turns about its axis.

The rocking of the shaft 36 is effected by the oscillation of a depending arm 40 on the shaft 36. The arm 40 is provided with a longitudinally extending slot 41 in which a pivot element 42 for the outer end of a connecting rod 43 is adjustably supported. Both the arm 40 and the slot 41 therein may be arcuately curved, as shown in Fig. 2. As best seen in Fig. 3, the pivot element 42 extends through the slot 41 and is adjustable vertically in the slot 41 and along the arm 40. Such adjustment may be effected by an adjusting mechanism comprising a pivoted rod 44 by which the pivot element 42 is supported, a vertically adjustable slide block 45, which carries the rod 44, and a screw 46 for adjusting the slide block 45 in a slideway 47 on the frame structure of the platform 4. Motion may be imparted to the screw 46 from a hand wheel 48 through the meshed bevel gears indicated at 49, Fig. 3.

The connecting rod 43 may be reciprocated by an essentric 50 on the driven shaft 51 of a speed reduction unit 52, which in turn is driven by a motor 53 through the agency of the motion transmitting connections indicated at 54, Fig. 1. Any suitable known mechanism may be employed to reciprocate the connecting rod 43 or an equivalent thereof.

The operation of the parts described so far may be substantially as follows:

The rotation of the driven shaft 51 and the consequent reciprocation of the connecting rod 43 will impart an oscillatory movement to the batch feeding member or pusher 25 so that the forward edge of the latter will be reciprocated back and forth in the batch in the feed chamber 14. As hereinbefore has been pointed out, the arrangement preferably is such that the axis of curvature of the plate and the axis of its oscillatory movements are coincident. The amplitude of this forward batch feeding or pushing movement of the member 25 and of its backward or retractive strokes may be varied within a wide range by adjustment of the place of connection of the connecting rod 43 with the arm 40.

The forward movement of the member 25 in its feed chamber will displace batch forwardly so that batch will be fed from the associate charging opening or passage 2 into the furnace, substantially as shown in Fig. 2. It will be noted that the oscillatory movements of the member 25 do not compact or confine batch between itself and walls of the feed chamber so as to cause grinding action by the batch on these relatively moving parts. The member 25 moves easily back and forth in the batch in the feed chamber so that but relatively little load is imposed on the driving mechanism.

The clearance between the member 25 and the adjacent walls of the batch feeding chamber is sufficient to prevent clogging of the device or binding of the relatively moving parts by uncrushed glass parisons or other relatively large pieces of cullet, such as are sometimes included in glass-making batch. Feeding of batch from the feed chamber to the furnace thus may be accomplished with a minimum abrasive action of the materials being fed on the member 25 and on the walls of the feed chamber.

Batch will not be carried or positively impelled rearwardly in the feeding chamber by the retractive strokes of the feeding implement. The retractive strokes of the implement thus will not cause further accumulation of batch in the chamber rearwardly of the inlet after operating conditions have been established.

The rock shaft 36, hereinbefore referred to as being rocked by the operation of the connecting rod 43, is common to the operating mechanisms for the entire battery of batch feeders F at the charging end of the tank. However, should it be desired to discontinue the operation of any one of such batch feeding devices, it is only necessary to remove the pin 38 between the arms 37 and 35 of the operating mechanism for that batch feeding device. The batch feeding member or pusher 25 of that device then will be inactive during the continued operation of the remaining batch feeding mechanisms.

The rate at which batch will be fed from each batch feeding mechanism through the associate charging opening into the tank or furnace may be regulated by adjustment of the amplitude of the strokes of the batch feeding or pusher member 25, or by adjustment of the frequency or speed of the operating movements of such member or by adjustments of both amplitude and frequency or speed.

It is desirable that the batch should be fed to the tank in sufficient quantity to compensate for withdrawal of glass from the tank. The amount of glass withdrawn may vary. It therefore is desirable that the feeding of the batch be regulated automatically in accordance with the withdrawal of glass so as to maintain a substantially constant level of glass in the portion of the tank from which glass is withdrawn. Any suitable automatic mechanism may be provided for controlling the operation of the motor 53 or of the driving mechanism for the batch feeder in accordance with the level of molten glass in the glass delivery end portion of the tank. An example of such a control mechanism is shown in Fig. 2, and comprises a vertically adjustable glass level indicating electrical conducting terminal 55 in the delivery end portion of the tank or in a forehearth connected with the tank. The terminal 55 is connected electrically with one side of a solenoid 56, the other side of which is connected electrically through a battery or source of electrical energy 57 with a cooperative terminal 58. The latter is constantly in contact with the glass in the tank. A short-circuiting or shunt conductor 59 is carried by the plunger of the solenoid so that when the solenoid operating circuit is closed by the rise of molten glass of the tank into contact with the terminal 55, the conductor 59 will be moved out of contact with spaced contact members 60 at opposite sides of a resistance 61 in the motor operating circuit. When the short-circuiting or shunt member 59 has been moved away from the contacts 60, as shown in Fig. 2, the motor operating circuit will include such resistance and the speed of the motor will be decreased, with a consequent reduction in the rate of feeding of batch to the tank. As soon as the level of the glass has fallen below the lower end of the terminal 55, the solenoid operating circuit will be broken and the short-circuiting conductor 59 will move into contact with the contact members 60, thereby practically cutting out the resistance 61 from the operating circuit of the motor and causing the speed of the motor to be increased. The arrangement preferably is such that the speed of the motor will cause feeding of the batch at a rate slightly less than that required to maintain the desired level of glass in the tank when the conductor 59 is not included in the motor operating circuit, and feeding of batch at a rate slightly in excess of that required for the maintenance of the desired level of glass in the tank when the conductor 59 is included in the motor operating circuit. With this arrangement, slight fluctuations of level of the glass in the tank may occur but will be quickly corrected so that the glass level will be maintained substantially uniform.

The particular automatic control means just described per se forms no part of the present invention, but is substantially as disclosed in the earlier filed application of Walter O. Amsler, Serial No. 271,179, filed April 19, 1928 and owned by the assignee of the present application. As hereinbefore has been pointed out, any suitable known automatic control mechanism may be employed in lieu of that illustrated in Fig. 2 of the accompanying drawings and above described. Such automatic control mechanism may be suitably connected with the adjustable operating mechanism for the feeding member so as to vary the stroke of such member to correct departures of the level of the glass in the tank from that desired.

Various changes in and modifications of the embodiment of the invention that is illustrated in the accompanying drawings and described herein may be made without departing from the spirit and scope of the invention.

I claim:

1. A batch feeder comprising a batch feed chamber having an outlet at one end for delivering batch to a glass melting furnace or tank, a batch feeding member of plate-like form adapted to be moved edgewise in the batch in the chamber toward and away from said outlet, and means for oscillating said batch feeding member with a movement having an upward component during the retractive stroke thereof.

2. A batch feeder comprising a chamber for the batch to be fed, said chamber having an outlet at one end thereof and an inlet at its top, and a batch feeding member of plate-like form movable substantially edgewise in the batch in said chamber toward and from said outlet, said batch feeding member having a substantially arcuate upper surface.

3. A batch feeder comprising a batch feed chamber having an outlet for delivering batch to a glass melting furnace or tank, and a batch feeding member movable in the batch in said chamber toward and from said outlet, said member being spaced from the walls of the chamber a distance greater than the vertical dimension of any portion of the batch impelling surface of such member.

4. A batch feeder comprising a batch feed chamber having an outlet at one end for delivering batch to the interior of a glass melting furnace or tank, a batch feeding member having the form of a plate curved from its rearward to its forward edge along an arc of a circle, said batch feeding member having its concavely curved surface uppermost, and means for oscillating said batch feeding member so that its forward edge moves in the batch in the feed chamber along a substantially horizontal path toward and from the outlet.

5. A batch feeder comprising a batch feed chamber having an outlet at one end for delivering batch to the interior of a glass melting furnace or tank, an arcuately curved batch feeding plate adapted to be moved substantially edgewise in the batch in said chamber toward and from said outlet, a carrier for said plate, said carrier being mounted to swing about a horizontal axis located in advance of the connection of the carrier and said plate and above the level of the path of movement of the plate in the batch in said chamber, and means for oscillating said carrier about said horizontal axis.

6. A batch feeder comprising a batch feed chamber having an outlet at one end for delivering batch to the interior of a glass melting furnace or tank, an arcuately curved batch feeding plate adapted to be moved substantially edgewise in the batch in said chamber toward and from said outlet, a carrier for said plate, said carrier being mounted to swing about a horizontal axis, means for oscillating said carrier about said axis, and means for adjusting the amplitude of the movements of said plate in said batch.

7. A batch feeder comprising a batch feed chamber having an outlet at one end for delivering batch to the interior of a glass melting furnace or tank, an arcuately curved batch feeding plate adapted to be moved substantially edgewise in the batch in said chamber toward and from said outlet, operating mechanism for oscillating said batch feeding plate in the batch in said chamber, and means for regulably controlling the speed of the oscillatory movements of said batch feeding plate.

8. A batch feeder comprising a batch feed chamber having an outlet at one end for delivering batch to the interior of a glass melting furnace or tank, an arcuately curved batch feeding plate adapted to be moved substantially edgewise in the batch in said chamber toward and from said outlet, operating mechanism for oscillating the plate in the batch in said chamber, and means for controlling the oscillatory movements of said batch feeding plate in accordance with the level of molten glass in a portion of said glass melting furnace or tank.

9. A batch feeder comprising a batch feed chamber having an outlet at one end for delivering batch to the interior of a glass melting furnace or tank, an arcuately curved batch feeding plate adapted to be moved substantially edgewise in the batch in said chamber toward and from said outlet, operating mechanism for oscillating said batch feeding plate in the batch in said chamber, and means for controlling the oscillatory movements of said batch feeding plate in accordance with the level of molten glass in a portion of said glass melting furnace or tank, said last-named means being operable automatically in response to a variation of such level to increase the rate of feeding of batch by said batch feeding member when the level falls in said furnace or tank below a predetermined level, and to decrease the feeding of batch by said batch feeding member when the level of glass in the tank rises above said predetermined level.

10. Batch feeding mechanism comprising a chamber having an outlet at one end adapted to be placed in register with a charging opening in a wall of a glass melting tank or furnace, said chamber having an inlet for batch at its top, a batch feeding member having the form of a plate adapted to be moved substantially edgewise in the batch in said chamber toward and from said outlet, and means for operating said batch feeding member, said last-named means comprising a carrier supported to swing about a horizontal axis, a rock shaft having periodically reversed angular movements about its axis, and motion transmitting mechanism actuated by said rock shaft to oscillate said carrier about said horizontal axis, said motion-transmitting mechanism including a device for discontinuing at will the motion transmitting connection between said rock shaft and said carrier.

11. Batch feeding mechanism comprising a chamber having an outlet at its forward end for delivering batch to a glass melting furnace or tank, said chamber having an inlet for batch at its top, a downwardly and forwardly inclined lip at the rear of said inlet, and a batch feeding member comprising a plate extending through an opening in the walls of the chamber at the rear of said lip and movable substantially edgewise in the batch in said chamber, said plate being curved along an arc of a circle and having its concavely curved surface uppermost.

12. The combination with a glass melting furnace or tank of a battery of batch feeders for delivering batch to the furnace or tank at a plurality of places spaced across the charging end of said furnace or tank, each of said batch feeders comprising a feed chamber having an outlet for delivering batch to the furnace or tank and a batch feeding member movable in the batch in said chamber toward and from the outlet thereof, an actuator common to all of said batch feeders, and separate motion transmitting mechanisms between said actuator and the respective movable batch feeding members for operating the latter, each of said motion transmitting mechanisms including a device operable at will to discontinue the operating connection between its batch feeding member and said actuator, whereby said batch feeders may be rendered inactive selectively.

13. A batch feeder comprising a batch feed chamber having an outlet, and a batch feeding member comprising an arcuately curved plate mounted for oscillation in the batch in the chamber about an axis coincident with the axis of curvature of the plate itself.

14. A batch feeder comprising a batch feed chamber having an outlet, and an arcuately curved plate mounted to swing toward and from the outlet in an arcuate path of substantially the same curvature as the plate itself, said plate extending rearwardly so that throughout its stroke a portion of said plate will have a slope in excess of the angle of repose of the batch in contact therewith.

15. A batch feeder comprising a batch feed chamber having an outlet, a batch feed member comprising an arcuately curved plate, and means for oscillating said plate in the batch in the chamber about an axis coincident with the axis of curvature of said plate and in such manner that the movements of said plate do not compress batch between the plate and any batch retaining or confining wall of the feed chamber.

16. A batch feeder comprising a batch feed chamber having an outlet, a batch feeding member movable in the batch in the chamber toward and away from said outlet, the portion of said member nearest to said outlet being of such character as to work in the batch in said chamber in spaced relation with the walls of the chamber and having substantially smooth and continuous longitudinal surfaces at all sides thereof, and means for mounting and operating said batch feeding member so that the portion thereof leaving the batch on the retractive stroke of said member will be inclined upwardly at an angle sufficient to render said member ineffective to carry any substantial amount of batch rearwardly in said chamber as said member is retracted.

EVERETT O. HILLER.